(12) United States Patent
Barr

(10) Patent No.: US 6,322,238 B1
(45) Date of Patent: Nov. 27, 2001

(54) AUXILIARY LIGHTING SYSTEM

(76) Inventor: Ralph S. Barr, 85 Crusaders, Springfield, IL (US) 62704

(*) Notice: Subject to any disclaimer, the term of this patent is extended or adjusted under 35 U.S.C. 154(b) by 0 days.

(21) Appl. No.: 09/482,439

(22) Filed: Jan. 13, 2000

(51) Int. Cl.[7] .................................................. B60Q 1/44
(52) U.S. Cl. ........................ 362/543; 362/541; 362/473
(58) Field of Search .................................. 362/473, 484, 362/487, 493, 540, 541, 542, 543, 497; 224/488, 494, 325, 326, 531, 924, 523, 525, 526; 40/204

(56) References Cited

U.S. PATENT DOCUMENTS

| | | |
|---|---|---|
| 3,041,580 | 6/1962 | Bos . |
| 3,080,581 | 3/1963 | Smihal . |
| 3,885,146 | 5/1975 | Whitley, Jr. . |
| 4,171,077 | 10/1979 | Richard, Jr. . |
| 4,269,339 * | 5/1981 | Bott ......................................... 362/73 |
| 4,286,309 | 8/1981 | Rasinski . |
| 4,711,381 * | 12/1987 | Felder ...................................... 362/72 |
| 4,857,890 * | 8/1989 | Solow ..................................... 362/497 |
| 4,859,982 | 8/1989 | Seaburg . |
| 4,903,174 | 2/1990 | Busby . |
| 5,157,591 | 10/1992 | Chudzik . |
| 5,438,490 | 8/1995 | Woodbury . |
| 5,544,022 | 8/1996 | Blackard . |
| 5,950,891 | 9/1999 | Brungardt et al. . |
| 6,095,387 * | 8/2000 | Lipscomb .............................. 224/924 |

* cited by examiner

Primary Examiner—Y. My Quach-Lee
(74) Attorney, Agent, or Firm—Polster, Lieder, Woodruff & Lucchesi, L.C.

(57) ABSTRACT

An auxiliary light system including a rectangular tubular frame having a horizontal elongated top frame member, an opposed and spaced apart horizontal elongated bottom frame member, a first vertical end frame member joining the first ends of the top and bottom frame members and a second vertical frame member joining the opposite ends of the top and bottom frame members and at least one support strut between the top and bottom frame members. A first light is mounted on the first vertical frame member and a second light is mounted on the second vertical frame member and electrically connected to a conventional plug to engage a socket electrically connected to the vehicle's electrical system, lights and directional signals. The wiring to the respective lights can be exposed or concealed within the tubular frame. The auxiliary system preferably can be used to provide taillights but also can provide headlights.

13 Claims, 3 Drawing Sheets

AUXILIARY LIGHTING SYSTEM

CROSS REFERENCE TO RELATED APPLICATION

None

STATEMENT REGARDING FEDERALLY SPONSORED RESEARCH OR DEVELOPMENT

Not applicable.

BACKGROUND OF THE INVENTION

This invention generally is related to vehicle lighting systems and, more specifically, to a set of auxiliary lights which can be attached to a vehicle, particularly the rear of the vehicle, when the rear of the vehicle has its original equipment lights partially obscured, to provide highly visible lighting.

Vehicle lighting systems are well known to the art. Vehicles, such as automobiles and trucks, include original equipment taillights that render the car visible from the rear in the dark and, other times, light when the driver applies the brakes, or signals to turn. Sometimes the original vehicle lights can be obscured, particularly if the vehicle is towing a trailer or has a rack, such as a conventional bicycle carrier rack, including a bicycle, attached to the rear of the vehicle. The trailer, the carrier rack or the bicycle often blocks the taillights creating a potentially dangerous situation.

A number of attempts have been made to provide supplemental, auxiliary or additional lighting for vehicles in general. For example, U.S. Pat. No. 5,438,490, to Woodbury, discloses a light mount for a towed vehicle; U.S. Pat. No. 5,157,591 to Chudzik, provides an attachable auxiliary lighting system; U.S. Pat. No. 4,859,982, to Seaburg, provides for a wireless taillight system; U.S. Pat. No. 4,286,309, to Rasinski, provides for a detachable vehicle lighting fixture; U.S. Pat. No. 4,171,077, to Richard, Jr., discloses bicycle carriers for buses and the like which include taillights; and U.S. Patent to Whitley, Jr. No. 3,885,146, provides for a detachable tail light assembly for boat trailers. The known prior art expedients still suffer from significant drawbacks. For the most part they are complex, including multiple parts. Moreover, they are not necessarily adapted to mount to a bicycle rack, for example, that has bicycles already mounted thereon which obstruct the view of the lights. Furthermore, many of the prior art designs have limited utility in that they are specifically designed for one application, such as taillights only, and lack broader utility.

It would be advantageous, therefore, to have an auxiliary lighting system that can be attached to a rear mounted vehicular bicycle rack having bicycles mounted thereon to provide unobstructed taillights to improve visibility and safety. Furthermore, it would be advantageous to have such auxiliary lights which have diverse applications, such as functioning as headlights, fog lights or halogen spot lights.

SUMMARY OF THE INVENTION

It is among the principal objects of the present invention to provide an auxiliary light system which can be used with a vehicle to improve visibility of the vehicles lights.

Another object of the present invention is to provide such an auxiliary light system that can be used for taillights or headlights.

Yet another object of the present invention is to provide such an auxiliary light system which can be attached directly to a bicycle that is mounted on a vehicle mounted bicycle rack to provide unobstructed taillights.

Still another object of the present invention is to provide such an auxiliary light system which can be attached directly to a vehicle, a towed trailer, or the like to provide unobstructed vehicular lighting.

Another object of the present invention is to provide an auxiliary light system that is lightweight and easy to use, economical to manufacture, and well suited for its intended purposes.

In accordance with the invention, generally stated, an auxiliary light system is provided having a generally rectangular tubular frame including a horizontal elongated top frame member, an opposed and spaced apart horizontal elongated bottom frame member, a first vertical end frame member joining the first ends of the top and bottom frame members and a second vertical frame member joining the opposite ends of the top and bottom frame members. The light system includes at least one support strut between the top and bottom frame members. A first light is mounted on one end of the frame, preferably on the first vertical frame member and a second light is mounted on the opposite end of the frame, preferably on the second vertical frame member. The respective lights are electrically connected to a conventional plug which can engage an socket electrically connected to the vehicles original equipment electrical system, lights and directional signals. The wiring connected to the respective auxiliary lights can be exposed or concealed within the tubular frame members. The auxiliary light system is designed to be attached directly to a bicycle which is mounted on a vehicle-mounted bicycle carrying rack. Alternatively, the system can be attached directly to the rack, to a towed trailer or towed vehicle or to the main vehicle itself. The auxiliary light system ideally is used to provide unobstructed taillights, but can be used on the front of a vehicle to provide additional headlights, fog lights or halogen lights.

BRIEF DESCRIPTION OF THE DRAWINGS

Corresponding reference figures indicate corresponding elements throughout the various drawings.

DETAILED DESCRIPTION OF THE INVENTION

Figure 1:
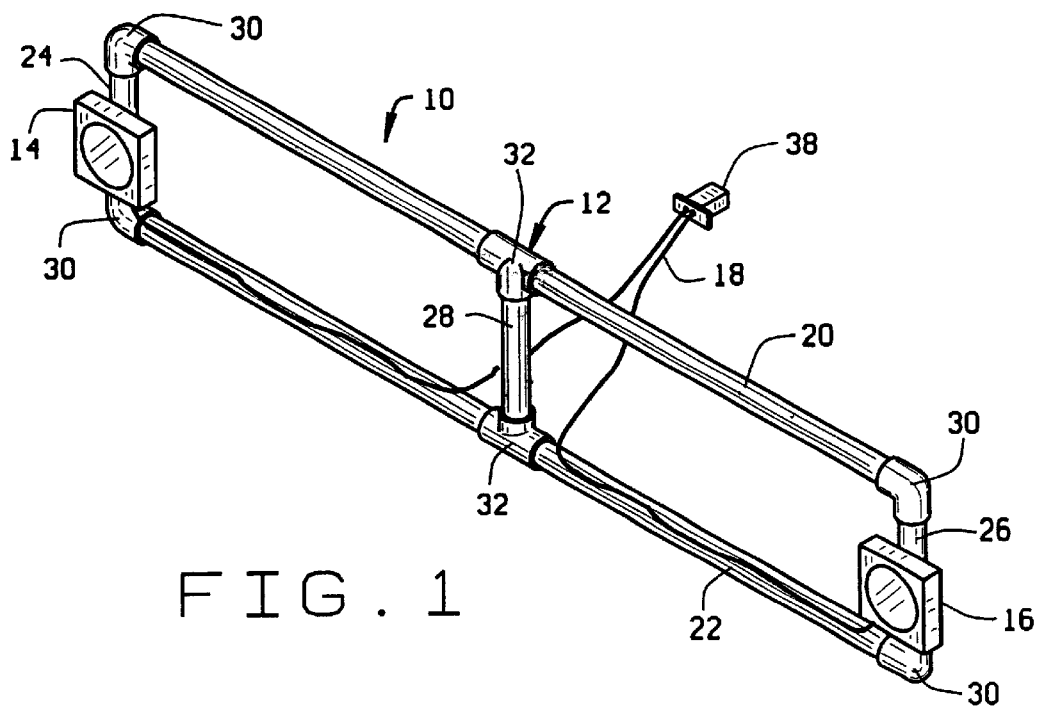
FIG. 1 is an isometric view of the auxiliary lighting system of the present invention.

The auxiliary lighting system of the present invention is indicated generally by reference numeral 10 throughout the various drawings. The auxiliary lighting system 10 includes a frame 12, at least two lights 14 and 16 and electrical wiring 18. The individual elements now will be described in greater detail.

Figure 7:
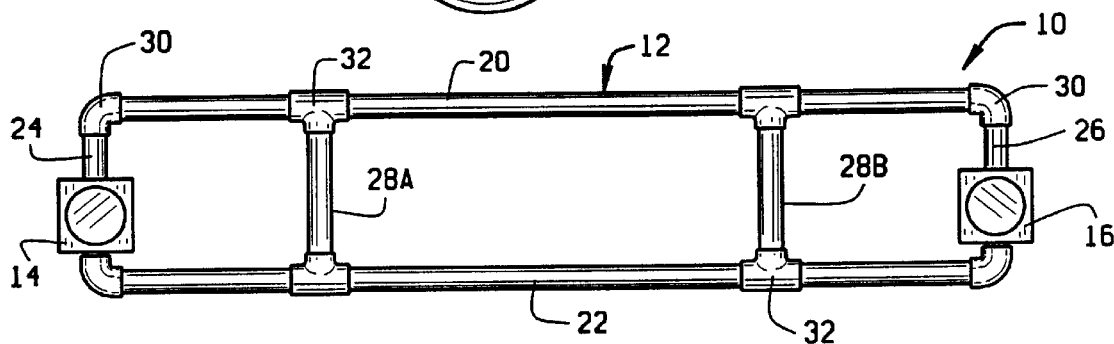
FIG. 7 is a front elevational view of an alternative embodiment of the auxiliary lighting system of the present invention.

Frame 12 includes a horizontal top frame member 20 and a spaced apart, opposed horizontal bottom frame member 22. One end of both the top and bottom frame members is joined by a vertical frame member 24. The opposite ends of the top and bottom frame members are joined by a vertical frame member 26. In the embodiment shown in FIGS. 1 and 2, for example, there is one vertical support member 28 positioned midway between the vertical frame members. In the embodiment as illustrated in FIG. 7, there are two vertical support members 28A and 28B.

Figure 2:
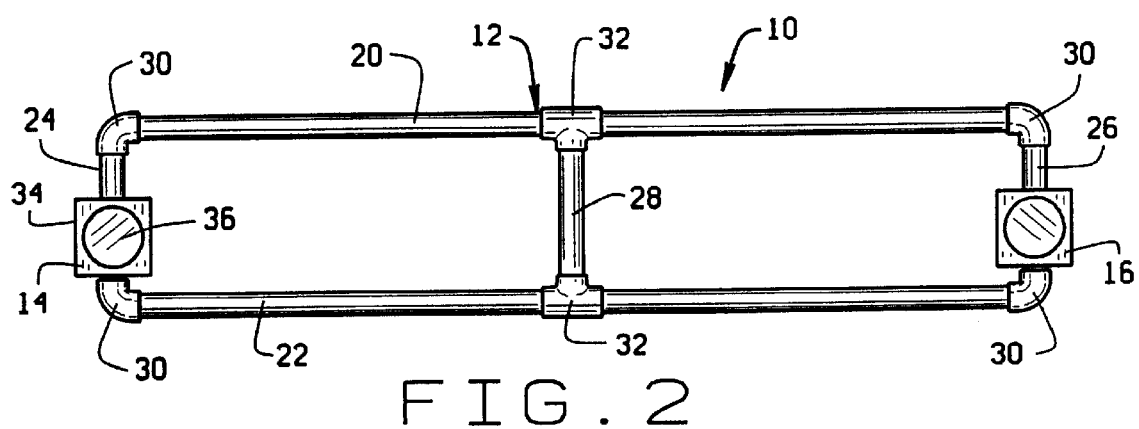
FIG. 2 is a front elevational view of the auxiliary lighting system of the present invention having the electrical wires housed in the frame.
Figure 3:
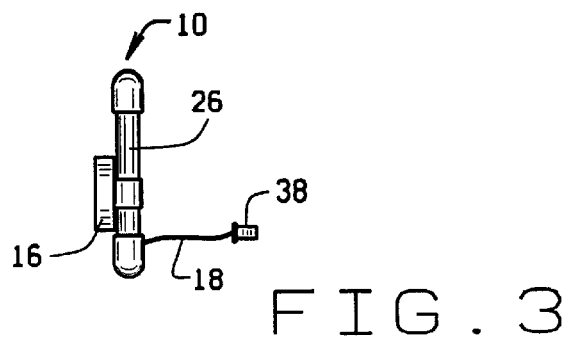
FIG. 3 is an end plan view thereof.

As illustrated, the respective frame members preferably are constructed from durable, lightweight tubular material such as PVC pipe or the like. For example, the illustrated frames include such tubular material with the vertical frame members 24 and 26 connected to the top and bottom frame members 20 and 22 with appropriately sized elbows 30. Similarly, the vertical support members 28, 28A and 28B are secured into the top and bottom frame members with T-connectors 32. It will be appreciated by those skilled in the art that the frame 12 can be constructed in this manner or can be constructed from contiguous sections of lightweight, durable, hollow material, such as PVC, extruded aluminum tubing or the like. Moreover, the various frame elements can be joined by any appropriate method, such as gluing, welding (in the case of metal) or by fasteners. Furthermore, the frame elements can be constructed from hollow material having a rectangular cross section, such as extruded square tubing, without departing from the scope of the invention. It also will be appreciated that the frame material can be solid, that is, not having an internal bore or cavity. It the case of the latter, the electrical wiring 18 necessarily must remain exposed, as shown in FIG. 1. In the case of the tubular frame elements, the wiring 18 can be concealed within the frame, as shown in FIGS. 2–8.

Figure 8:
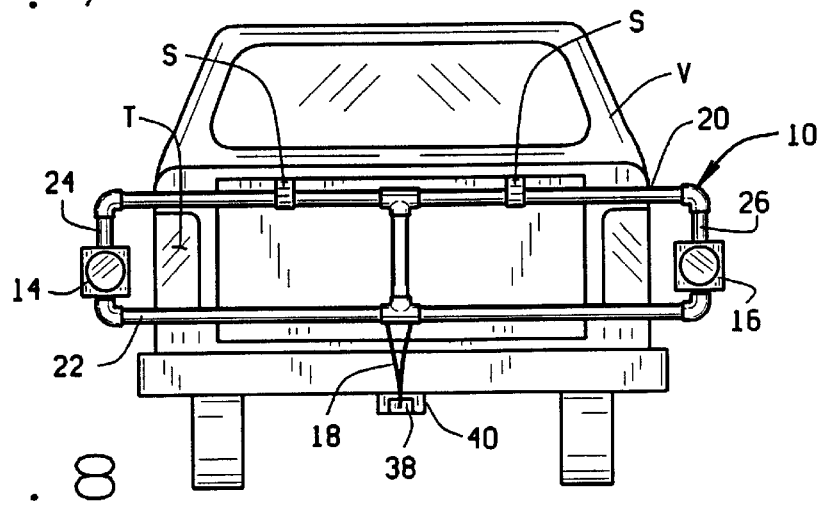
FIG. 8 is a front elevational view of the auxiliary lighting system of the present invention attached directly to a vehicle.

The lights 14 and 16, as shown in the drawings, are conventional taillights having a conventional housing 34, bulbs (not shown) and lenses 36. The lights 14 and 16 are securely mounted on the respective vertical frame members 24 and 26 by any acceptable methods, such as brackets, bolts, screws or the like. It will be appreciated that the lights 14 and 16 are electrically connected to a vehicle's electrical system via electrical wires 18. As shown, electrical wires 18 are operably connected to a plug 38 which is designed to engage a conventional socket 40 on a vehicle V (FIG. 8). When lights 14 and 16 are taillights, the lights, via plug 38 and socket 40, are operably connected to the vehicle's original equipment lighting system, including the taillight circuit, including the brake lights and the directional signals, so that lights 14 and 16 function in the same way as vehicle V's original equipment taillights T.

It will be appreciated by those skilled in the art that the auxiliary light system of the present invention can be employed to provide headlights, fog lights, or front halogen lighting. For example, lights 14 and 16 of system 10 can be one of the just described types of lights. Frame 12 can be mounted on the front of the vehicle, for example to the grill, and plug 18 can engage a pigtail which extends out of the front grill of the vehicle, for example.

Figure 4:
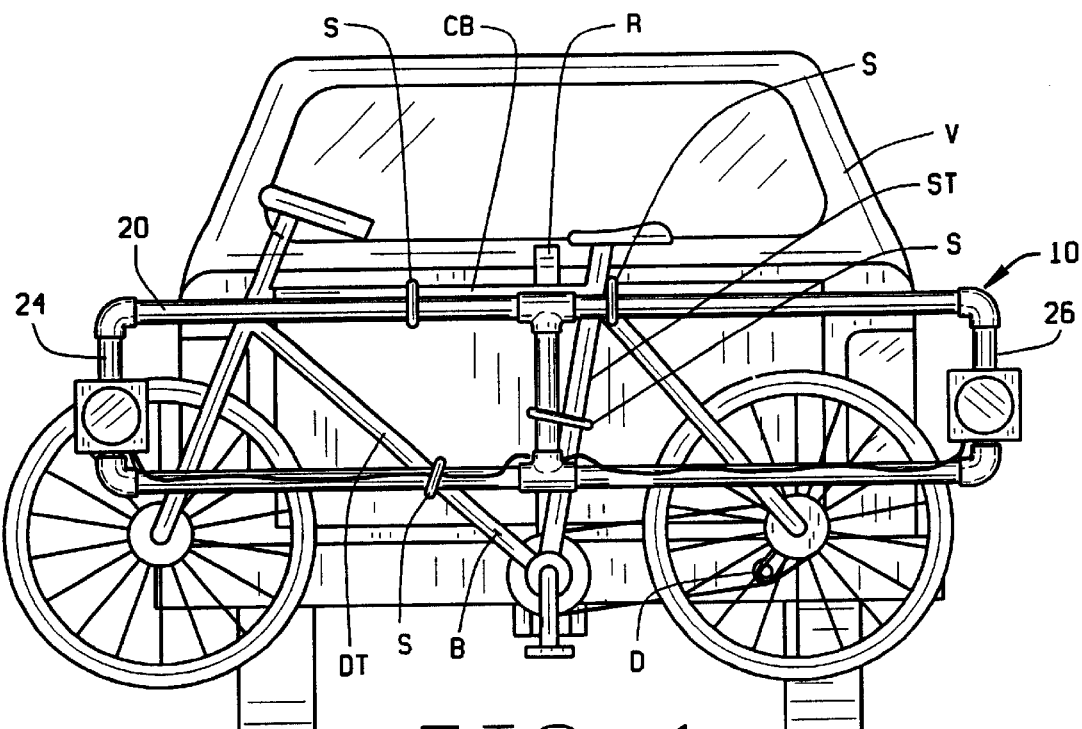
FIG. 4 is a front elevational view of the auxiliary lighting system of the present invention attached to a bicycle which is mounted on a vehicle bicycle rack.
Figure 5:
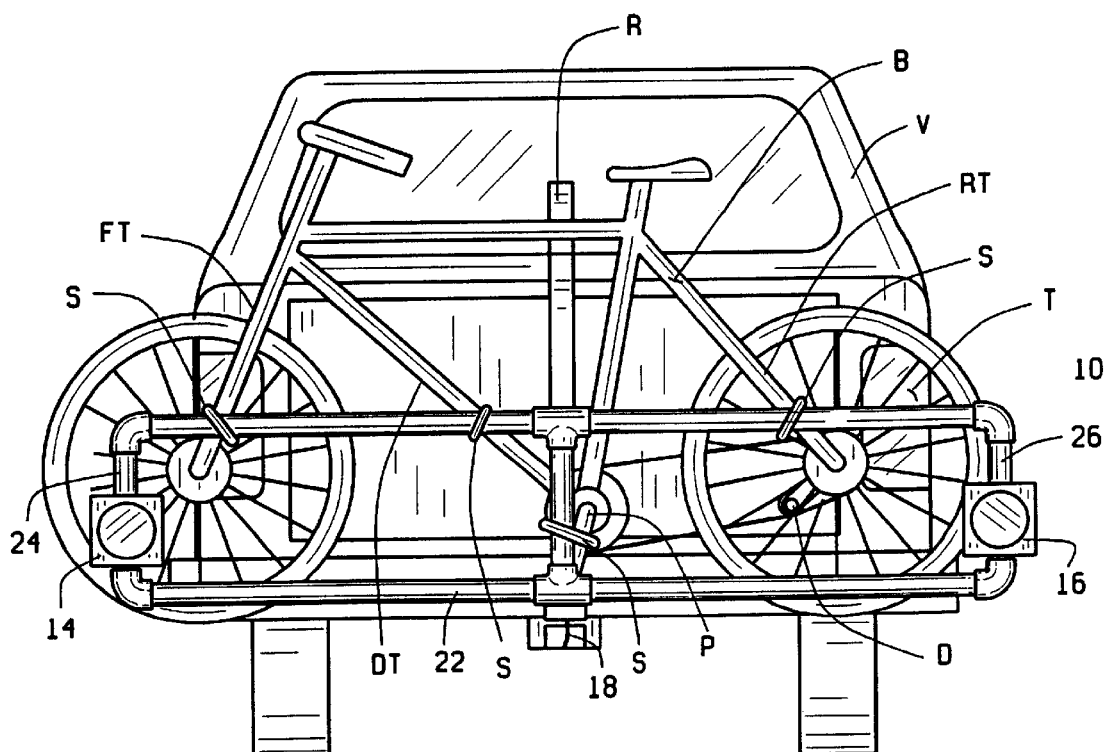
FIG. 5 is another front elevational view of the auxiliary lighting system of the present invention attached to a bicycle which is mounted in an alternative position on a vehicle bicycle rack.
Figure 6:
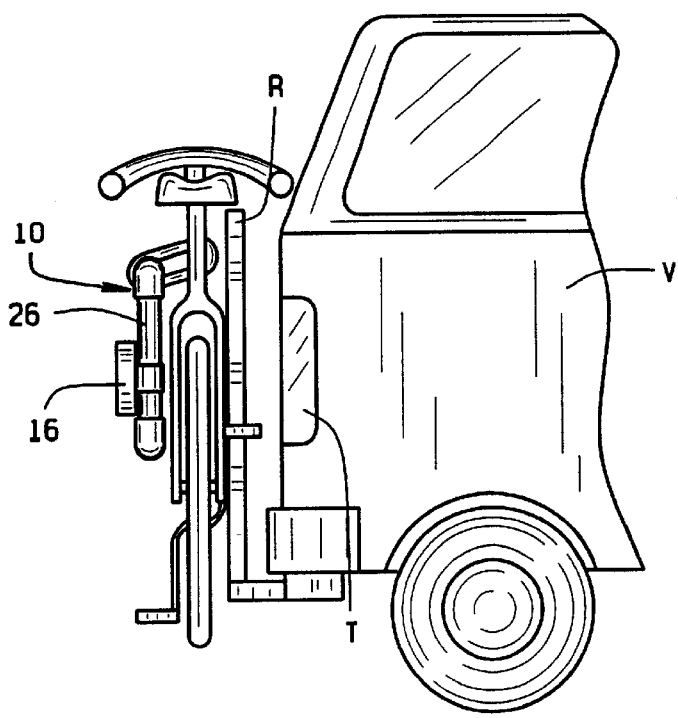
FIG. 6 is an end plan view of the auxiliary lighting system of the present invention attached to a bicycle which is mounted on a vehicle bicycle rack.

The auxiliary light system 10 of the present invention primarily is used to provide unobstructed rear lights or taillights, as shown in FIGS. 4–6 and 8. FIGS. 4–6 illustrate the use of auxiliary light system 10 in conjunction with a vehicular bike rack R to provide unobstructed taillights when a bicycle B is mounted on rack R. As shown, the bicycle B is conventionally and securely mounted on rack R. The auxiliary light system 10 is position against the bicycle B and secured by use of a number of straps S. The various straps S can be constructed from a relatively flexible, but resilient material, such as a bungee cord or resilient flexible strapping having Velcro®. The novel design of the frame 12 allows the straps S to be attached to the bicycles front tube FT, the pedal arm P and a rear tube (or seat stay) RT (FIG. 5), the down tube DT or to the seat tube ST and crossbar CB as desired for maximum security and balance. In the event the bicylce is mounted on the rack opposite to the bicycle shown in FIGS. 4 and 5, the novel design of the frame allows the frame to surround but not touch the derailleur D and thereby prevent damage to the gearing.

As shown in FIG. 8, the auxiliary lighting system 10 can be attached directly to vehicle V by straps S or the like. As shown, the straps S are pinched in the vehicle tailgate. Alternatively, the back side of frame 12 could be equipped with magnets for attachment directly to the vehicle. Mounting directly to the vehicle provides for convenient storage of the system or provides for additional lighting, if desired. Furthermore, other items the driver wishes to transport could attach with straps S directly to frame 12, as long as it does not obscure lights 14 and 16, thus allowing the auxiliary lighting system 10 to function as a carrying rack.

In view of the foregoing, it is apparent that various changes and modifications may be made in the auxiliary lighting system of the present invention without departing from the scope of the appended claims. Therefore, the foregoing description and accompanying drawings are intended to be illustrative only and should not be construed in a limiting sense.

What is claimed is:

1. An auxiliary lighting system for attachment to a vehicle having a lighting system comprising:
    a frame oriented in a vertical plane relative to the vehicle, said frame having a first horizontal frame member, a spaced apart and opposed second horizontal frame member, a first vertical frame element joining one end of the first and second horizontal members and a second vertical frame element joining an opposite end of said first and second horizontal frame members, and at least one vertical support member joining said first and second horizontal frame members;
    a first light on said frame
    a second light on said frame; and
    electrical wiring for electrically connecting said first and second lights to the lighting system of the vehicle.

2. The auxiliary lighting system of claim 1 wherein said first light is at said first vertical frame element and said second light is at said second vertical frame element.

3. The auxiliary lighting system of claim 1 wherein said electrical wiring is substantially contained within said frame.

4. The auxiliary lighting system of claim 1 wherein said first and second lights are taillights.

5. In a vehicle having an electrical light system and a bicycle rack attached to the vehicle with a bicycle removably mounted on said bicycle rack, an auxiliary lighting system for removable attachment to the bicycle to provide unobscured lighting comprising:
    a frame mounted in a vertical orientation to the vehicle, the frame having a first horizontal member, a second horizontal member, a first vertical member joining an end of said first and second horizontal members and a second vertical member joining an opposite end of said first and second horizontal members, and at least one vertical support member joined between said first and second horizontal frame members;

a first light on said first vertical frame member;

a second light on said second vertical frame member; and an electrical connection between said first and second lights and the vehicle electrical light system.

6. The auxiliary lighting system of claim 5 wherein said first and said second lights are taillights.

7. The auxiliary lighting system of claim 5 wherein said frame is attached to the bicycle by at least one flexible, resilient strap.

8. The auxiliary lighting system of claim 5 wherein said electrical connection is housed within said frame.

9. The auxiliary lighting system of claim 5 wherein said electrical connection further comprises a plug for engaging a receptacle on said vehicle, said receptacle being operably connected to a vehicle lighting system.

10. An auxiliary lighting system which can be removably attached to a vehicle, the vehicle including an original equipment lighting system, the auxiliary lighting system comprising:

a frame removably attached to the vehicle in a vertical orientation, said frame including a horizontal top frame member, a horizontal bottom frame member, a first vertical frame member joining a first end of both the horizontal top frame member and the horizontal bottom frame member, a second vertical frame member joining a second end of said horizontal top frame member and the horizontal bottom frame member;

at least one vertical support between said horizontal top frame member and said horizontal bottom frame member;

a first light at said first vertical frame member;

a second light at said second vertical frame member; and an electrical connection between said first and second lights and the vehicle's original equipment lighting system whereby said lights are operably connected into the original equipment lighting system.

11. The auxiliary lighting system of claim 10 wherein said first and second lights are taillights.

12. The auxiliary lighting system of claim 10 wherein said frame is constructed from a tubular material.

13. The auxiliary lighting system of claim 10 wherein said electrical connection is contained within said frame.

* * * * *